US012565064B2

(12) United States Patent
Doroshenko et al.

(10) Patent No.: US 12,565,064 B2
(45) Date of Patent: *Mar. 3, 2026

(54) VEHICLE PNEUMATIC TYRE COMPRISING SEALANT LAYER HAVING RADIALLY INWARD FACING SURFACE AND LUMINESCENT AGENT ATOP SURFACE

(71) Applicant: Continental Reifen Deutschland GmbH, Hannover (DE)

(72) Inventors: Mikheil Doroshenko, Garbsen (DE); Andreas Tyburski, Ilsede (DE)

(73) Assignee: Continental Reifen Deutschland GmbH, Hannover (DE)

( * ) Notice: Subject to any disclaimer, the term of this patent is extended or adjusted under 35 U.S.C. 154(b) by 377 days.

This patent is subject to a terminal disclaimer.

(21) Appl. No.: 17/760,434

(22) PCT Filed: Nov. 30, 2020

(86) PCT No.: PCT/EP2020/083933
§ 371 (c)(1),
(2) Date: Aug. 9, 2022

(87) PCT Pub. No.: WO2021/160312
PCT Pub. Date: Aug. 19, 2021

(65) Prior Publication Data
US 2023/0111041 A1 Apr. 13, 2023

(30) Foreign Application Priority Data
Feb. 10, 2020 (DE) ..................... 10 2020 201 586.4

(51) Int. Cl.
*B60C 19/12* (2006.01)
*B29B 17/02* (2006.01)
(Continued)

(52) U.S. Cl.
CPC ............ *B60C 19/122* (2013.01); *B29B 17/02* (2013.01); *B29B 2017/0279* (2013.01);
(Continued)

(58) Field of Classification Search
None
See application file for complete search history.

(56) References Cited

U.S. PATENT DOCUMENTS 2,566,384 A * 9/1951 Tilton, Jr. ............. B60C 19/122
152/504 X
2,587,470 A * 2/1952 Herzegh ................... 152/504 X
(Continued)

FOREIGN PATENT DOCUMENTS

CN 101516643 A 8/2009
CN 106335142 A 1/2017
(Continued)

OTHER PUBLICATIONS

Decision of rejection dated Feb. 23, 2024 for the counterpart Chinese Patent Application No. 2020800959483 and machine translation of same.
(Continued)

*Primary Examiner* — Adrienne C. Johnstone
(74) *Attorney, Agent, or Firm* — Richard A. Wolf; Gregory Adams

(57) ABSTRACT

A pneumatic vehicle tire which includes a sealant layer at least on the inner surface opposite the tread. The sealant layer has a radially inward-facing surface running in the axial direction substantially parallel to the belt package. Also provided is a process for detecting a pneumatic vehicle tire with a sealant layer and to a process for recycling a pneumatic vehicle tire with sealant. The sealant layer has at least one luminescent agent on its radially inward-facing surface. The tire is detected via the luminescent agent.

15 Claims, 3 Drawing Sheets

(51) Int. Cl.
*B29C 73/24* (2006.01)
*B29D 30/06* (2006.01)
*B29L 30/00* (2006.01)

(52) U.S. Cl.
CPC ....... *B29B 2017/0282* (2013.01); *B29C 73/24*
(2013.01); *B29L 2030/00* (2013.01); *Y02W*
*30/62* (2015.05); *Y10T 152/10684* (2015.01)

(56) References Cited

U.S. PATENT DOCUMENTS

| | | | |
|---|---|---|---|
| 2,752,978 A * | 7/1956 | Kindle | 152/504 X |
| 3,903,947 A | 9/1975 | Emerson | |
| 4,892,891 A | 1/1990 | Close | |
| 4,918,976 A | 4/1990 | Fogal, Sr. | |
| 5,500,456 A | 3/1996 | Hughett et al. | |
| 6,494,543 B1 * | 12/2002 | Hashimura | B60C 19/00 |
| | | | 152/510 X |
| 6,508,898 B1 | 1/2003 | Rustad et al. | |
| 2005/0113502 A1 | 5/2005 | Fitzharris Wall et al. | |
| 2005/0155686 A1 | 7/2005 | Yukawa et al. | |
| 2005/0197481 A1 | 9/2005 | Temple | |
| 2006/0254687 A1 | 11/2006 | Sandstrom | |
| 2007/0089824 A1 | 4/2007 | Yukawa | |
| 2007/0131327 A1 | 6/2007 | Yukawa et al. | |
| 2008/0251186 A1 | 10/2008 | Yukawa | |
| 2010/0012243 A1 | 1/2010 | Tanno et al. | |
| 2016/0003704 A1 | 1/2016 | Firestone et al. | |
| 2018/0200975 A1 | 7/2018 | Yamada et al. | |
| 2018/0281322 A1 * | 10/2018 | Dahlke | B29C 73/163 |
| 2019/0337250 A1 * | 11/2019 | Dahlke | B29D 30/0685 |
| 2019/0389256 A1 | 12/2019 | Griebel et al. | |
| 2020/0254817 A1 | 8/2020 | Moriyama | |
| 2023/0125304 A1 * | 4/2023 | Doroshenko | B29B 17/02 |
| 2023/0128058 A1 * | 4/2023 | Doroshenko | B29D 30/0685 |
| | | | 152/504 |

FOREIGN PATENT DOCUMENTS

| | | | |
|---|---|---|---|
| CN | 107000347 A | 8/2017 | |
| CN | 110225834 A | 9/2019 | |
| CN | 110621517 A | 12/2019 | |
| DE | 3042350 A1 | 5/1982 | |
| DE | 102006059286 A1 | 6/2008 | |
| DE | 202015006945 U1 | 10/2015 | |
| DE | 102016214496 A1 | 2/2018 | |
| DE | 102016219666 A1 | 4/2018 | |
| DE | 102017210929 A1 | 1/2019 | |
| EP | 0367556 A2 | 5/1990 | |
| EP | 1510366 A1 | 3/2005 | |
| EP | 1721932 A1 | 11/2006 | |
| EP | 1795377 A2 | 6/2007 | |
| EP | 2006125 A1 | 12/2008 | |
| EP | 1533108 B1 | 9/2012 | |
| EP | 3308984 A1 | 4/2018 | |
| EP | 3498494 A1 | 6/2019 | |
| EP | 3552849 A1 | 10/2019 | |
| EP | 3564022 A1 | 11/2019 | |
| EP | 3578394 A1 | 12/2019 | |
| JP | H0390339 A | 4/1991 | |
| JP | H07290457 A | 11/1995 | |
| JP | H1086605 A | 4/1998 | |
| JP | 2002362118 A | 12/2002 | |
| JP | 2003142263 A | 5/2003 | |
| JP | 2005112111 A | 4/2005 | |
| JP | 2011057203 A | 3/2011 | |
| JP | 2012254655 A | 12/2012 | |

| | | | | |
|---|---|---|---|---|
| WO | WO-2016/088014 A1 * | 6/2016 | | |
| WO | WO-2017059975 A1 * | 4/2017 | | B29C 73/163 |
| WO | WO-2017220225 A1 * | 12/2017 | | B29C 73/163 |
| WO | WO-2018/112179 A1 * | 6/2018 | | |
| WO | 2019042609 A1 | 3/2019 | | |

OTHER PUBLICATIONS

U.S. Appl. No. 17/760,440: Restriction Requirement dated Mar. 1, 2024, U.S. Appl. No. 17/760,440: Non-Final Office Action dated May 9, 2024.
U.S. Appl. No. 17/760,439: Non-Final Office Action dated Apr. 10, 2024.
International Search Report dated Feb. 5, 2021 of International Application PCT/EP2020/083933 on which this application is based on.
International Search Report dated Mar. 12, 2021 of International Application PCT/EP2020/083931 on which this application is based on.
International Search Report dated Feb. 4, 2021 of International Application PCT/EP2020/083929 on which this application is based on.
International Search Report dated Feb. 1, 2021 of International Application PCT/EP2020/083934 on which this application is based on.
A Guide to Fluorochromes—abcam—https://docs.abcam.com/pdf/immunology/fluorochrome_guide.pdf.
Wikipedia—Fluorophore—https://en.wikipedia.org/wiki/Fluorophore.
Wikipedia—Ethidium Bromide—https://en.wikipedia.org/wiki/Ethidium_bromide.
Chinese Office Action dated Oct. 12, 2023 corresponding to Chinese Patent Application No. 202080095948.3.
Guoqan Chen et al., "Preparation and development of paint additives. (涂料添加剂的制法配方及开发)", Shanghai Science and Technology Literature Press, 1989, pp. 345-346.
Chinese Refusal of Decision dated Jan. 8, 2024 for the cross referenced Chinese Patent Application No. 202080095410.3 and machine translation of same.
Chinese Notice of acceptance of the request for review dated Nov. 4, 2024 for the cross referenced Chinese Patent Application No. 202080095410.3 and machine translation of same.
Chinese Refusal of Decision dated Feb. 23, 2024 for the counterpart Chinese Patent Application No. 202080095948.3 and machine translation of same.
Chinese Notice of acceptance of the request for review dated May 24, 2024 for the cross counterpart Chinese Patent Application No. 202080095948.3 and machine translation of same.
Chinese Refusal of Review dated Sep. 6, 2024 for the cross referenced Chinese Patent Application No. 202080095510.5 and machine translation of same.
Chinese Review Decision dated Oct. 30, 2024 for the cross referenced Chinese Patent Application No. 202080095510.5 and machine translation of same.
U.S. Non-Final Office action dated Nov. 18, 2024 for the cross referenced U.S. Appl. No. 17/760,436.
U.S. Office action dated Aug. 15, 2024 of US related family U.S. Appl. No. 17/760,440.
U.S. Office action dated Sep. 4, 2024 of US related family U.S. Appl. No. 17/760,436.
Comprehensive fluorophore list (includes absorption and emission peak values—from Zeiss, retrieved online: https://www.biosyn.com/Images/ArticleImages/Comprehensive%20fluorophore%20list.pdf, available prior to Feb. 10, 2020.

* cited by examiner

VEHICLE PNEUMATIC TYRE COMPRISING SEALANT LAYER HAVING RADIALLY INWARD FACING SURFACE AND LUMINESCENT AGENT ATOP SURFACE

TECHNICAL FIELD

The invention relates to a pneumatic vehicle tire which comprises a sealant layer at least on the inner surface opposite the tread, wherein the sealant layer has a radially inward-facing surface running in the axial direction substantially parallel to the belt package. The invention further relates to a process for detecting a pneumatic vehicle tire with a sealant layer and to a process for recycling a pneumatic vehicle tire with sealant.

BACKGROUND

Self-sealing pneumatic vehicle tires are known for example from the applicant's own DE 10 2006 059 286 A1. These involve subsequently providing standard tire constructions with a sealant layer. The selfsealing sealant is a self-adhesive, viscous sealing compound which is applied as a layer from the inside in the radial direction in the projection region of the belt package to the radially innermost tire layer, the largely airtight inner layer. The sealant layer is capable of automatically sealing punctures of up to 5 millimeters in diameter. After a puncture through the tread to through the inner layer, the sealant completely surrounds the penetrating foreign body, seals the interior off from the environment and hence prevents loss of compressed air from the tire. The driver of the vehicle is not forced to replace the defective tire immediately with an equivalent replacement wheel or an emergency wheel.

SUMMARY

The sealant is notable for airtightness, high tackiness and balanced flow characteristics.

However, the strong tackiness of the sealant makes it difficult to recycle the tires. Tires—without sealant are typically initially comminuted during recycling. Should the tires contain a tire comprising a sealant the tackiness of the sealant severely impedes comminution since the sealant adheres to the comminution apparatus and impedes further comminution to an ever greater extent.

Pneumatic vehicle tires with and without sealant are optically difficult or impossible to distinguish from one another at first glance since the sealant is usually attached to the black inner wall of the tire as a black mass. The tires would therefore require more careful inspection one by one.

However, especially in the case of a multiplicity of tires, individual inspection of every time by an operator would be very costly and inconvenient.

It is accordingly an object of the present invention to provide a pneumatic vehicle tire which comprises a sealant layer at least on the inner surface opposite the tread, wherein the sealant layer has a radially inward-facing surface running in the axial direction substantially parallel to the belt package (pneumatic vehicle tire with sealant), which is easier to distinguish from pneumatic vehicle tires without sealant.

The object is achieved when the sealant layer comprises at least one luminescent agent on its radially inward-facing surface.

As a result of pneumatic vehicle tires with sealant comprising at least one luminescent agent on the radially inward-facing surface of the sealant, the tires are easier to distinguish from pneumatic vehicle tires without sealant.

The tires may in particular be distinguished with a detector, in particular a photodiode, after supply of energy in an automated process without any need for individual inspection of the tire by an operator.

However, any operator can also identify such a tire with a sealant more quickly and unambiguously as a result of the luminescence.

This simplifies and facilitates the recycling of pneumatic vehicle tires with sealant.

The operations of detection using a detector and detection by an operator are both referred to as "detection" in the context of the present invention.

Since only the surface of the sealant comprises at least one luminescent agent, the tires may be distinguished from one another without any need to make the entirety of the sealant luminescent.

EP 1533108 B1 discloses a pneumatic vehicle tire with a colored non-black sealant, so that as a result of the sealant flowing to the puncture site in the event of a puncture, the puncture site is more easily detectable from the outside.

This is not the problem addressed by the present invention. The pneumatic vehicle tire according to the invention has the advantages over the tire according to EP 1533108 B1 that less luminescent agent is required and that the sealant can contain advantageous carbon blacks for reinforcement, thus making it possible to avoid the challenges of using silica as filler. Furthermore, detection via luminescence can be quicker and more unambiguous compared to colored marking.

The invention is more particularly elucidated hereinbelow and further advantageous embodiments are described. Unless otherwise stated or technically infeasible, different embodiments may also be combined with one another.

DETAILED DESCRIPTION

Figure 1:
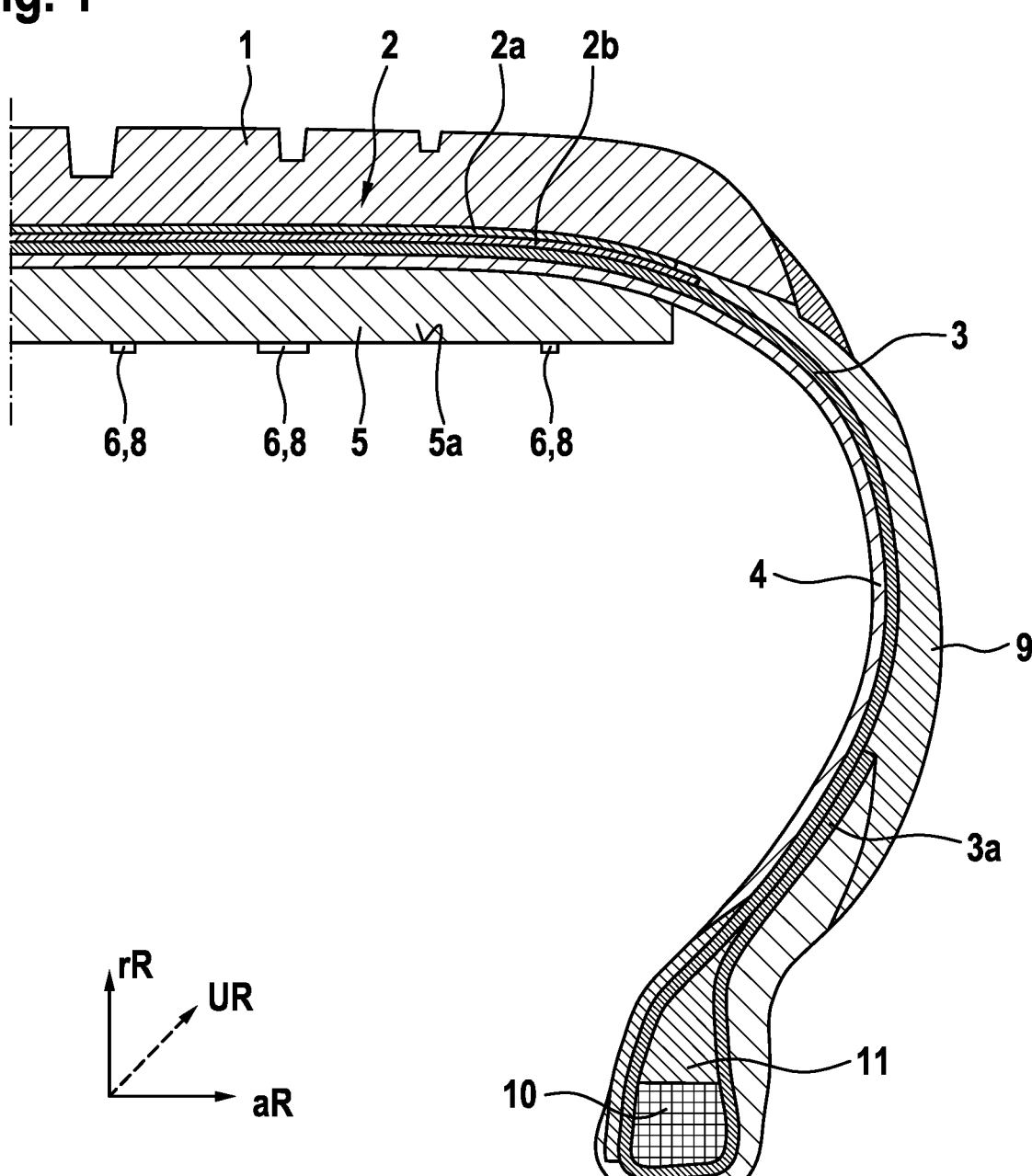
FIG. 1 illustrates a tire having a luminescent agent according to an embodiment of the present disclosure.

A "luminescent agent" is to be understood as meaning a substance/an agent which has luminescent properties. Such substances are also known as "fluorophores".

According to Römpp Online Chemie Lexikon (last updated August 2008) "luminescence . . . is the emission of light in the visible, UV and IR spectral range of gases, liquids and solids after supply of energy".

Depending on the type of energy supplied, a distinction can be made, for example, between photoluminescence, chemiluminescence, thermoluminescence and radioluminescence.

Types of luminescence that are caused in particular by photoluminescence include fluorescence and phosphorescence, wherein a distinction is made according to the duration between excitation (absorption of light) and luminescence (glowing through emission).

In the context of the present invention, the "luminescent agent" should not be restricted from the outset by a (formal) distinction between the different types of luminescence with regard to the type of excitation or the duration of the emission.

In an advantageous embodiment of the invention it is preferable when the luminescent agent is excitable by light and may therefore be described as a photoluminescent agent. It is further preferable when the luminescent agent has fluorescent or phosphorescent properties and is therefore a fluorescent agent or a phosphorescent agent.

In an advantageous embodiment of the invention it is preferable when the luminescent agent absorbs light in the wavelength range from 200 to 700 nm and emits light in the wavelength range from 350 to 800 nm. It may therefore be excited with UV light or visible light and may emit light in the range which is visible to humans and/or may be measured and thus detected using a photodiode.

The luminescent agent may in principle be any substance exhibiting luminescent properties and is therefore selected for example from the group comprising coumarin derivatives, such as methoxycoumarin, peptides or proteins, such as green fluorescent protein (GFP), rhodamine, ethidium bromide, organic substances available under the trade names Alexa Fluor®, for example Alexa Fluor® 350, Alexa Fluor® 405, Alexa Fluor® 488, Alexa Fluor® 532, etc, quantum dots, for example QDOT® 525, QDOT® 565, QDOT® 665.

It is especially possible to employ all of the agents disclosed in the following sources:

docs.abcam.com/pdf/immunology/fluorochrome-_guide.pdf biosyn.com/Images/ArticleImages/Comprehensive%20fluorophore%20list.pdf en.wikipedia.org/wiki/Fluorophore en.wikipedia.org/wiki/Ethidium bromide In the event that the luminescent agent is a molecule, the weight-average molecular weight (Mw) is for example and in particular from 200 to 250 000 g/mol.

In the event that the luminescent agent is quantum dots, the particle size (measured by dynamic light scattering) is for example from 2 to 2000 nm.

It is an essential feature of the invention that the sealant layer comprises at least one luminescent agent on its radially inward-facing surface.

Two or more different agents may also be present.

"At least one" refers to the type of luminescent agent. All elucidations apply both to the presence of one type of luminescent agent or two or more types of luminescent agents unless expressly stated otherwise.

Even the smallest amounts can have the desired luminescent effect.

The expression "on its radially inward-facing surface" is to be understood as meaning a position arranged on the sealant layer in the direction of the tire interior facing away from the tread in the radial direction.

It is not necessary for the entirety of the abovementioned surface to be covered with the luminescent agent.

In advantageous embodiments the luminescent agent has been arranged circumferentially in the form of one or more strip(s), wherein the strip(s) may be continuous or interrupted. One or more strips may be easily circumferentially applied in an automated manner continuously or in sections.

Two or more strips may be arranged parallel to one another or non-parallel to one another for example.

In advantageous embodiments the luminescent agent has been arranged on the surface of the sealant layer in individual spatial (i.e. separate) regions. The regions may be distributed systematically or randomly.

Even the smallest amounts in regions that are small relative to the surface and have a diameter of less than 1 mm can bring about the technical advantage that the tires can be detected and thus more easily distinguished from tires without sealant and luminescent agent.

In further advantageous embodiments the luminescent agent covers 0.01% to 100%, preferably 0.01% to 90%, in particular 1% to 80%, for example 1% to 10%, of the radially inward-facing surface.

It may optionally be helpful for the tire and/or the excitation source and optionally the detector to be rotated during detection.

Various embodiments of how the luminescent agent may be applied to the sealant surface are described below. All embodiments are combinable with the described possible configurations and the resulting coverage of the surface of the sealant.

In advantageous embodiments of the invention the luminescent agent has been applied by means of a dispersion, in particular suspension or emulsion, or a solution, wherein the dispersion or the solution contains from 1% to 80% by weight of luminescent agents.

The reported amounts in % by weight relate to the total mass of the dispersion or solution before drying.

In advantageous embodiments the dispersion contains at least one binder, such as polystyrene or polymethyl methacrylate or styrene-acrylate copolymer or polyvinyl acetate.

The dispersion is preferably a suspension. In this embodiment the luminescent agent(s) are suspended in a liquid.

The reported amounts in % by weight relate to the total mass of the suspension before drying.

The suspension may be applied easily and in a material-saving manner.

The liquid of the suspension may be any conceivable liquid compatible with the particular sealant.

In advantageous embodiments of the invention the suspension is an aqueous suspension which is particularly environmentally friendly.

In further advantageous embodiments of the invention the luminescent agent is dissolved in a solution, wherein the solution contains at least one solvent and from 1% to 80% by weight, preferably from 5% to 50% by weight, particularly preferably from 10% to 30% by weight, very particularly preferably 20% to 30% by weight, of luminescent agents.

The reported amounts in % by weight relate to the total mass of the solution before drying.

In advantageous embodiments the solution too contains at least one binder, such as polystyrene or polymethyl methacrylate or styrene-acrylate copolymer or polyvinyl acetate.

A solution is simple to apply.

The solvent(s) may be any conceivable liquid compatible with the particular sealant.

In advantageous embodiments of the invention the solution is an aqueous suspension which is particularly environmentally friendly and non-flammable.

In advantageous embodiments the luminescent agent is water-soluble.

In advantageous embodiments it is preferable for the liquid of the solution or dispersion, such as in particular suspension or emulsion, to comprise water which in particular has the abovementioned advantages.

In advantageous embodiments the luminescent agent is hydrophilic and dissolved in water or hydrophobic and dispersed in water or partially dissolved in water.

In further preferred embodiments of the invention the solvent is at least one organic solvent. The organic solvent may in principle be any suitable solvent known to those skilled in the art, such as alcohols (mono- or polyalcohols), ketones, esters, aldehydes, aromatics, alkanes such as hexane, or ethers, such as petroleum ether.

In preferred embodiments the organic solvent is selected from solvents which are compatible with the sealant and the remaining tire components and do not cause these to swell or dissolve constituents thereof, such as in particular simple alcohols, such as ethanol or isopropanol. These are also relatively environmentally friendly and most water insoluble luminescent agents are easily soluble in them.

In further advantageous embodiments of the invention the luminescent agent has been applied in the form of a solid, in particular in powder form. This makes it possible to dispense with further substances, which has ecological and economic advantages. In addition, no further process step for drying is necessary.

The powder may have been applied to the sealant by air atomization, for example using a gun, or electrostatically.

In further advantageous embodiments of the invention the luminescent agent is a constituent of a film. A film too is able to applied easily and in a material-saving manner, in particular at a constant film thickness.

The film may—similarly to the other application options—cover for example the entire surface of the sealant or only parts thereof.

In advantageous developments of the invention the luminescent agent (in particular in powder form) or the medium in which it has been applied (in particular dispersion, solution or film) is simultaneously tackiness reducing. Further substances may optionally be present to this end.

At least one alkali metal salt of at least one fatty acid and/or at least one alkaline earth metal salt of at least one fatty acid may additionally be present as disclosed in DE 202015006945 U1 for example.

In advantageous embodiments the luminescent agent has been applied at a film thickness (measured in the radial direction (rR) perpendicular to the axial direction (aR) of the vehicle tire) of 100 nm (nanometers) to 3500 µm (micrometers).

In advantageous embodiments of the invention the film thickness is from 1 to 400 µm (micrometers), particularly preferably 5 µm to 100 µm, In further advantageous embodiments of the invention the film thickness is 2500 to 3500 µm (micrometers). In this embodiment it is possible to employ for example strips (stickers) having dimensions of 100 mm×10 mm×3 mm.

The described film thicknesses and embodiments allow the sealant to receive luminescent marking in a manner that is as material-saving as possible.

In advantageous embodiments of the invention the sealant is black or almost black. This means that the sealant has a hue according to RAL color codes 9004 to 9007, 9011 or 9017 to 9023 for example.

The sealant may also be brown or gray or clear, wherein in the case of a clear sealant the black inner liner of the tire shows through.

To this end the sealant preferably contains at least one filler which gives it the black hue. This may in particular be carbon black and/or graphite and/or graphene and/or carbon nanotubes.

Carbon black is in particular to be understood as meaning industrial carbon blacks and pyrolysis carbon blacks.

The sealant particularly preferably contains at least one carbon black, very particularly preferably at least one industrial carbon black.

This has the advantage that the cohesion of the sealant is increased and the tackiness of the sealant during the production process is reduced. The stationarity and the tear properties of the sealant are simultaneously improved.

In the context of the present invention all carbon black types known to the skilled person are conceivable in principle.

In an advantageous embodiment of the invention a carbon black having an iodine adsorption number according to ASTM D 1510 of 20 to 180 g/kg, particularly preferably 30 to 140 g/kg, and a DBP number according to ASTM D 2414 of 30 to 200 ml/100 g, preferably 90 to 180 ml/100 g, particularly preferably 110 to 180 ml/100 g, is employed.

In a further preferred embodiment of the invention an N326-type carbon black is used.

A mixture of two or more carbon blacks is also conceivable.

The sealant may be selected from all suitable sealant compositions known to those skilled in the art, such as for example those based on silicone, or based on polyurethane or based on the crosslinking of a rubber and/or a polyolefin.

In an advantageous and exemplary embodiment the sealant contains at least one rubber. It preferably contains 15% to 60% by weight of at least one rubber.

The rubber may be selected from any rubber types known to those skilled in the art. A mixture of different rubbers is also conceivable.

In a preferred embodiment of the invention the rubber is natural rubber (NR) and/or butadiene rubber (BR) and/or isoprene rubber (IR) and/or styrene-butadiene rubber (SBR) and/or polychloroprene (CR) and/or butyl rubber (IIR) and/or bromobutyl rubber (BIIR) and/or chlorobutyl rubber (CIIR) and/or silicone rubber.

These rubber types are particularly well suited for the processing temperatures during the production of the sealant and later during the use, in particular in the pneumatic vehicle tire.

In exemplary embodiments the sealant may in particular contain natural and/or synthetic polyisoprene, preferably natural polyisoprene.

It is possible to employ, for example, solid natural rubber (NR) in conjunction with liquid polyisoprene.

The sealant may contain for example natural rubber and styrene butadiene rubber (SBR), for example ESBR (emulsion-polymerized styrene-butadiene rubber). The crosslinking may be based on peroxides and/or on sulfur crosslinking. For example sulfur may be used in conjunction with peroxidic agents, such as "VAROX-Organic-PeroxideCrosslinking-Agents" from Vanderbilt Chemicals, LLC for example. The ratio of NR to ESBR is for example from 30% to 40% by weight to 60% to 70% by weight.

In further exemplary embodiments the sealant is a silicone-based sealant.

In an advantageous and exemplary embodiment the sealant is based on the crosslinking of a rubber and/or polyolefin. The elucidations above apply to the rubber.

It is apparent to those skilled in the art that all of the recited constituents in the crosslinked sealant are at least partially present in chemically altered form, in particular in the form of derivatives.

It is particularly preferable to employ at least butyl rubber (IIR). Butyl rubber is particularly well-suited since it exhibits a relatively high airtightness.

In a particularly advantageous embodiment of the invention the self-sealing tire sealant contains 10% to 50% by weight of at least one polyolefin. This achieves optimal flow characteristics coupled with good producibility (processability) of the sealant.

The at least one polyolefin preferably has a number-average molecular weight distribution $M_n$ according to GPC of 400 to 2500 g/mol, particularly preferably 800 to 2500 g/mol, very particularly preferably 800 to 1600 g/mol, in turn preferably 1200 to 1600 g/mol, in turn particularly preferably 1200 to 1400 g/mol, for example 1300 g/mol.

A polyolefin having the recited ranges for $M_n$ is particularly suitable for achieving the desired flowability and sealing activity of the sealant in the event of a puncture.

The at least one polyolefin is particularly preferably at least one polybutene.

This establishes the tackiness of the finished sealant and determines the flowability in the production process as well as the local stationarity of the finished sealant.

The at least one polyolefin may also be a mixture of two or more polybutenes each having an $M_n$ of 400 to 2500 g/mol, wherein the polybutenes may differ in their $M_n$.

Suitable polybutenes, also known as polyisobutenes are obtainable for example known under the trade name Indopol® polybutenes from INEOS Capital Limited.

A mixture of at least one polybutene with at least one other polyolefin is also conceivable.

It is apparent to those skilled in the art that the recited constituents in the crosslinked sealant are at least partially present in chemically altered form, in particular in the form of derivatives.

The sealant is preferably based on crosslinking by at least one crosslinker selected from the group containing, particularly preferably consisting of, polymethylol resin and divinylbenzene and quinones. The quinone is preferably a quinone dioxime, for example dibenzoylquinone dioxime or para-benzoquinone dioxime. Para-benzoquinone dioxime is particularly preferred.

The sealant is preferably based on crosslinking by at least one crosslinker in conjunction with a crosslinking initiator, wherein the crosslinking initiator is preferably selected from the group containing lead oxide and other metal oxides and peroxidic compounds. The crosslinking initiator is a chemical compound that initiates the crosslinking of the sealant.

A peroxide compound is a chemical compound that contains at least one peroxide unit, i.e. —O—O— (wherein O=oxygen). Two or more peroxides may also be used. The peroxide(s) are preferably selected from the group consisting of diaryl peroxides, diacyl peroxides and peroxyesters.

The crosslinking initiator may be added as a pure substance or in a mixture. In the case of a mixture, for example of 50% by weight of dibenzoyl peroxide in dibutyl maleate, only the amount of the peroxide present is included in the amount of crosslinking initiator and the accompanying substances such as dibutyl malonate are therefore disregarded in the reported amounts of the at least crosslinking initiator.

The sealant may also contain further constituents, such as in particular black-coloring substances, such as the abovementioned fillers, in particular carbon black, and optionally further filler(s) such as in particular silica and optionally further additives such as for example tackifiers, plasticizers, for example oil(s), and zinc oxide and/or sulfur.

In a further preferred embodiment of the invention the filler comprises at least one silica.

This achieves optimal reinforcement of the sealant and good viscosity control and adjustment. In addition, the use of at least one silica increases the cohesion of the sealant and reduces the tackiness of the sealant during the production process. The stationarity and the tear properties of the sealant are simultaneously improved.

A mixture of two or more silicas is also conceivable.

The silicas may be silicas known to those skilled in the art which are suitable as fillers for tire rubber mixtures. Employable silicas thus include for example not only those of the type Ultrasil® VN3 (trade name) from Evonik but also silicas having a relatively low BET surface area (such as for example Zeosil® 1115 or Zeosil® 1085 from Solvay) and highly dispersible silicas, so-called HD silicas (for example Zeosil® 1165 MP from Solvay).

Also conceivable and preferable is a mixture of the recited fillers, such as in particular at least one industrial carbon black in combination with at least one silica, which likewise affords the recited advantages.

In further advantageous embodiments the sealant contains at least one tackifier, especially in the case where the sealant does not already exhibit a sufficient tackiness on account of the constituents, in particular the polymers, present. The term "tackifier" is in principle to be understood as meaning any substance which increases the tackiness of the sealant.

In advantageous embodiments of the invention the tackifier is at least one hydrocarbon resin.

It will be clear to those skilled in the art that hydrocarbon resins are polymers constructed from monomers, wherein the hydrocarbon resin is formally constructed from derivatives of the monomers by linkage of the monomers to one another.

The term "hydrocarbon resins" encompasses in the context of the present application resins which comprise carbon atoms and hydrogen atoms and may comprise optionally heteroatoms, such as in particular oxygen atoms.

The hydrocarbon resin may be a homopolymer or a copolymer. In the present application the term "homopolymer" is to be understood as meaning a polymer which, according to Römpp Online (retrieved on Jan. 2, 2017, article last updated August 2008), "has been formed from monomers of only one type".

In the context of the present invention "copolymer" is to be understood as meaning a polymer formed from a plurality of, i.e. two or more, different monomers. In the context of the present invention the hydrocarbon resin may therefore also be a copolymer of three different monomers for example.

The monomers may be any monomers of hydrocarbon resins that are known to those skilled in the art, such as aliphatic monomers, in particular aliphatic $C_5$ monomers, further cationically polymerizable unsaturated compounds containing aromatics and/or terpenes and/or alkenes and/or cycloalkenes.

Preferred monomers are in particular $C_5$ and $C_9$ monomers.

The aromatics (aromatic monomers) may be for example alpha-methylstyrene and/or styrene and/or vinyltoluene and/or indene and/or coumarone and/or methylindene and/or methylcoumarone and/or phenol.

The aromatic monomers are preferably alphamethylstyrene and/or styrene and/or vinyltoluene and/or indene and/or coumarone and/or methylindene and/or methylcoumarone.

According to Römpp Online the term "olefins" is the "common term for acyclic and cyclic aliphatic hydrocarbons having one or more reactive $C=C$ double bonds in the molecule, nowadays better referred to as alkenes or cycloalkenes, and in the broader sense is also a term for the substituted derivatives thereof . . . " In the context of the present invention unsaturated terpenes, alkenes and cycloalkenes are thus encompassed by the umbrella term "olefins".

The alkenes may be 1-butene and/or 2-butene and/or butadiene for example.

In a preferred embodiment of the invention the hydrocarbon resin is at least one aliphatic resin, i.e. a resin which contains no aromatic ring systems. Such a resin consists to an extent of 100% by weight of aliphatic monomers/derivatives thereof.

In a further embodiment of the invention the resin consists to an extent of 10% to 99% by weight, preferably 50% to 99% by weight, particularly preferably 70% to 99% by weight, of aliphatic monomers and to an extent of 1% to 90% by weight, preferably 1% to 50% by weight, particularly preferably 1% to 30% by weight, of aromatic monomers.

In a preferred embodiment of the invention the hydrocarbon resin is at least one resin constructed at least from $C_5$ monomers and known to those skilled in the art as so called $C_5$ resin. This makes it possible to achieve particularly good properties of the sealant, in particular optimized flow characteristics coupled with good tackiness.

The aliphatic $C_5$ monomers may be monomers from the $C_5$ crude oil fraction, for example isoprene, and/or monomers of the terpenes and/or cycloolefins and/or olefins, for example pentene. The term "$C_5$" is to be understood as meaning that these monomers are constructed from five carbon atoms.

It is further known to those skilled in the art that apart from aliphatic monomers having five carbon atoms the $C_5$ crude oil fraction may also contain other aliphatic monomers (building blocks) having for example four carbon atoms, i.e. $C_4$ monomers, or six carbon atoms, $C_6$ monomers.

In an advantageous embodiment of the invention the sealant contains 2% to 30% by weight of at least one hydrocarbon resin as tackifier. The amount of the at least one hydrocarbon resin is preferably 2% to 20% by weight.

Such preferred and particularly preferred amounts further optimize the tackiness and the viscosity of the adhesive.

In advantageous embodiments of the invention the sealant contains the following constituents in the following amounts:

10% to 50% by weight of at least one polyolefin, preferably of at least one polybutene, and 2.0% to 30% by weight of at least one tackifier and 15% to 60% by weight of at least one rubber and 2.0% to 22% by weight of at least one filler and 1.0% to 3.0% by weight of at least one crosslinker and 1.8% to 4.8% by weight of at least one crosslinking initiator.

The reported amounts in % by weight are in each case based on the total amount of sealant.

The sealant composition may be produced by known processes and apparatuses, in particular by intensive mixing in a mixer or extruder, in particular a twin-screw extruder.

The sealant is applied to the inner surface of the tire using processes and apparatuses known to those skilled in the art.

The luminescent agent is applied to the radially inward-facing surface of the sealant according to its type. It may in particular be applied as a powder or as a suspension, emulsion or solution or as a constituent of a film.

The invention further provides a process for detecting a pneumatic vehicle tire according to the invention to distinguish pneumatic vehicle tires comprising a sealant from pneumatic vehicle tires without a sealant.

In the process according to the invention the sealant layer is identified optically by an operator or using a detector after supply of energy as a result of the at least one luminescent agent.

The detector may in particular be a photodiode.

Suitable detectors are known to those skilled in the art and are usually computer-aided.

The detector may further be a handheld device or a detector used in an automated process by a robot.

Depending on the coverage of the surface of the sealant with the at least one luminescent agent it may be advantageous to rotate the tire and/or the detector.

The invention further provides a process for recycling pneumatic vehicle tires according to the invention comprising at least the process steps of:

A) providing the pneumatic vehicle tire to be recycled;

B) performing the process according to the invention for detection of a pneumatic vehicle tire according to the invention as a result of the luminescence;

C) separating the sealant from the pneumatic vehicle tire;

D) subsequently comminuting the pneumatic vehicle tire without sealant.

In advantageous embodiments the process steps A) to D) are carried out in an automated manner.

The invention further provides a process for recycling pneumatic vehicle tires comprising at least the process steps of:

a) providing pneumatic vehicle tires to be recycled;

b) performing the process according to the invention for detecting a pneumatic vehicle tire according to the invention in order to distinguish pneumatic vehicle tires with sealant from pneumatic vehicle tires without sealant;

c) spatially separating pneumatic vehicle tires comprising a sealant from pneumatic vehicle tires without sealant;

d) recycling pneumatic vehicle tires without sealant comprising comminution of the pneumatic vehicle tires;

e) transferring pneumatic vehicle tires comprising a sealant to a separate recycling process comprising separation of the sealant and comminution of the pneumatic vehicle tires only subsequently.

In advantageous embodiments the process steps a) to d) are carried out in an automated manner. In an advantageous embodiment of the invention step c) is carried out in an automated manner in conjunction with step b).

Figure 2:
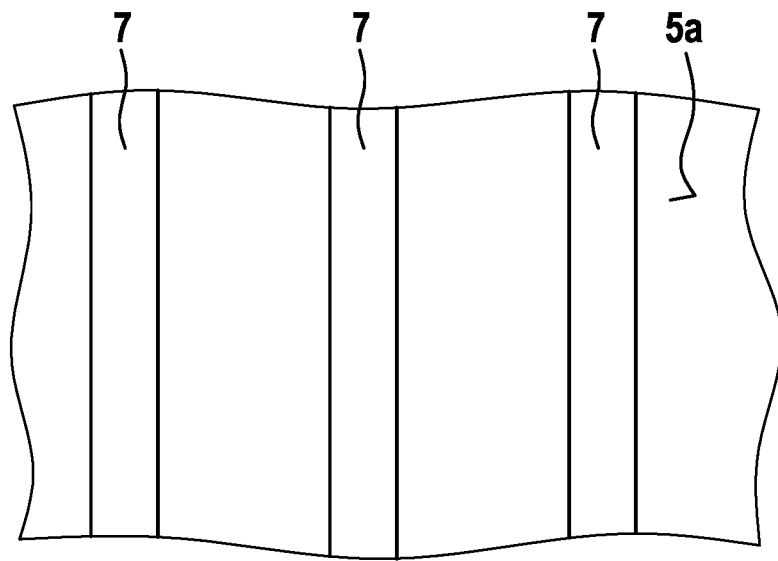
FIG. 2 is another embodiment showing a schematic sector of the plan view of the radially inward-facing surface in which the luminescent agent has been applied in the form of a plurality of parallel strips
Figure 3:
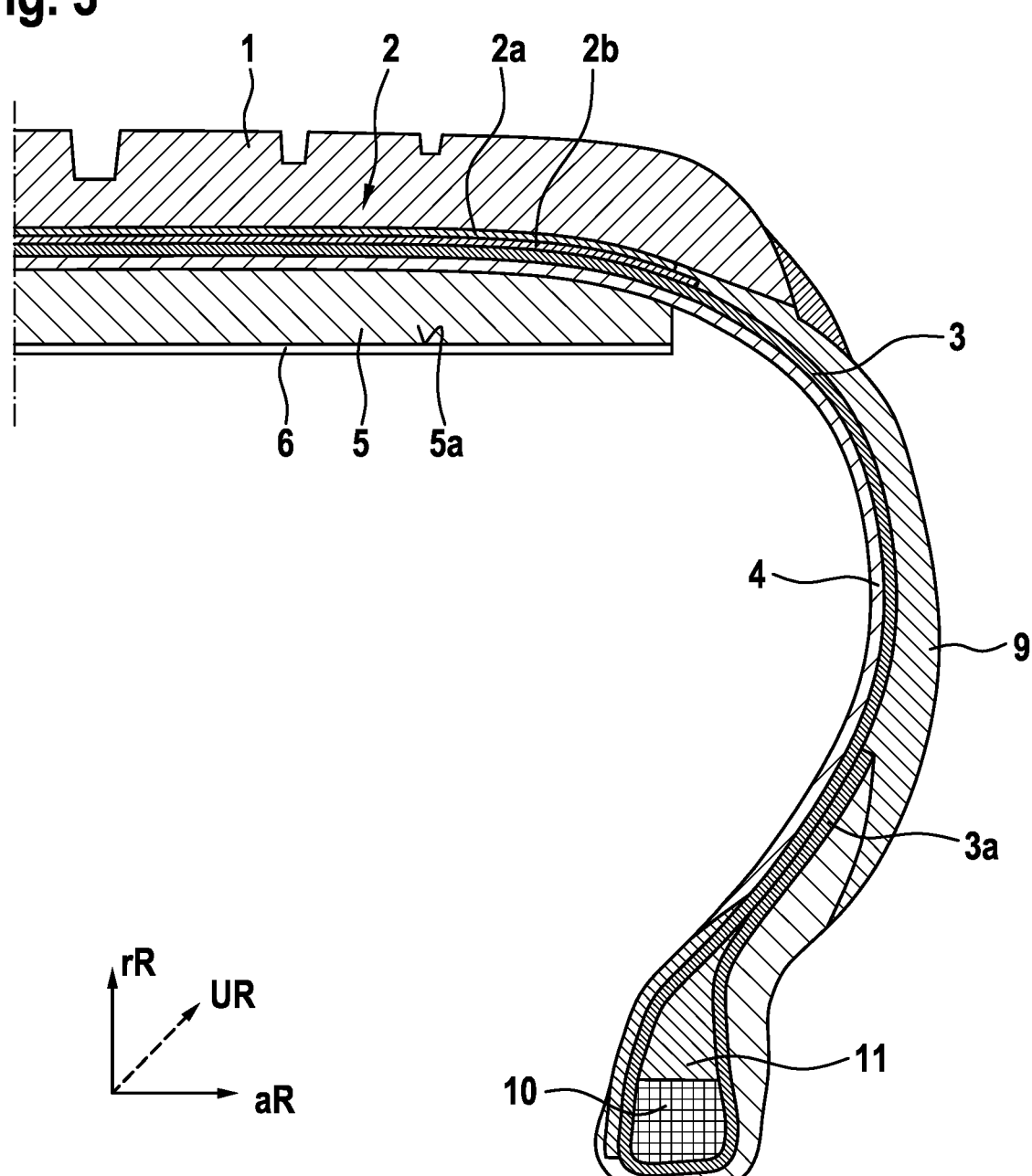
FIG. 3 illustrates another embodiment of a tire according to the present disclosure in which the luminescent agent covers almost the entire surface.

Further particulars of the invention are more particularly elucidated with reference to FIGS. 1 to 3, which are exemplary schematic representations.

The essential constituents of which the pneumatic vehicle tire of the invention is composed are a profiled tread 1, a belt package 2 that consists of two layers 2a, 2b in the execution shown, a single-layer carcass 3 which is guided around the bead cores 10 and bead core profiles 11 from the inside outward in axial terms and ends in the carcass turnup 3a, and side walls 9. The two layers 2a, 2b of the belt package 2 consist of reinforcing elements of steel cord that are embedded in a rubber compound and run parallel to one another within each layer, the steel cords of the one layer 2a being oriented in a crossing arrangement in relation to the steel cords of the second layer 2b and each forming an angle between 15° and 45° with the circumferential direction of the tire. The single-layer carcass 3 may also be formed in a conventional and known way, and consequently have reinforcing fibers of a textile material or of steel cord that are embedded in a rubber compound and run in the radial direction. The self-sealing of the pneumatic vehicle tire is obtained by means of a sealant layer 5 subsequently applied circumferentially on the inside in radial direction after the vulcanization of the pneumatic vehicle tire. The sealant layer 5 has essentially the width of the belt package 2 and has been arranged essentially in the projection thereof and has a cross section which is formed in the cross-sectional plane including the tire axis and has a radially inward facing surface 5a running in the axial direction substantially parallel to the belt package.

According to the example in FIG. 1 a luminescent agent 6 has been arranged radially inward on the sealant layer 5, i.e. on the radially inward-facing surface 5a of the sealant layer 5.

Figure 1A:
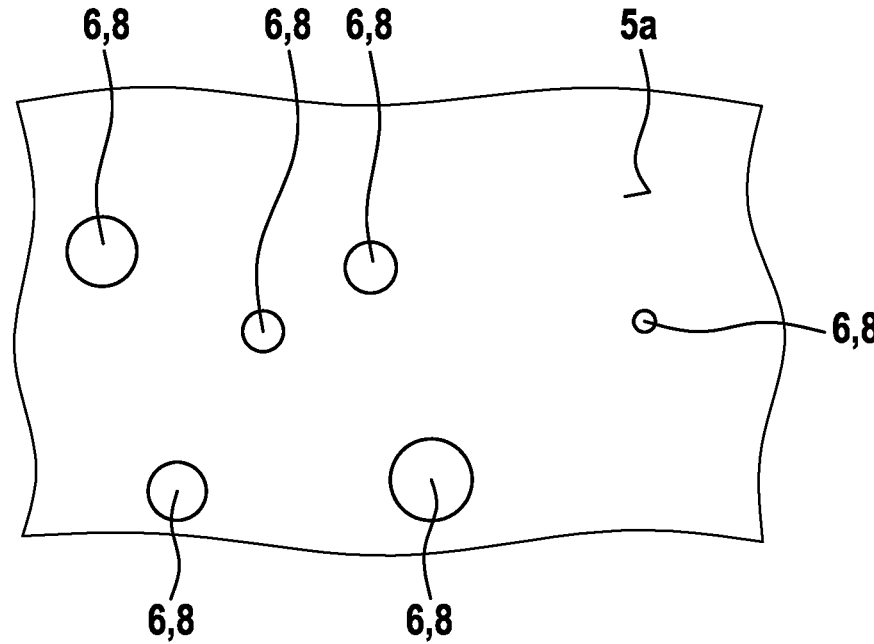
FIG. 1a shows a schematic sector of the plan view of the radially inward-facing surface of the tire in FIG. 1.

In FIG. 1 the luminescent agent 6 has been applied with a random distribution in individual spatial regions 8, as illustrated again in plan view in FIG. 1a. FIG. 1a shows a schematic sector of the plan view of the radially inward-facing surface 5a.

FIG. 2 likewise shows a schematic sector of the plan view of the radially inward-facing surface 5a. In FIG. 2, the luminescent agent 6 has been applied in the form of a plurality of parallel strips 7. There may be three (see FIG. 2) or four strips (not shown in the figures) for example.

In FIG. 3 the luminescent agent 6 covers almost the entire surface 5a.

The luminescent agent 6 has been applied in a solution or suspension for example. The liquid of the solution or suspension is, for example, water, wherein styrene-acrylate copolymer may further be present as a binder.

The luminescent agent 6 may be any of the abovementioned agents which is soluble or suspensible in water, for example Rhodamine 6G.

The sealant itself is black. For reinforcement it contains at least one carbon black, in particular N 326, and the abovementioned composition After excitation, in particular by light in the wavelength range from 200 to 700 nm, the luminescence through emission of light in the wavelength range from 350 to 800 nm nanometers may either be identified by an operator or detected using a photodiode.

The pneumatic vehicle tire described by way of example can now be distinguished through luminescence as described from pneumatic vehicle tires without sealant by the process according to the invention.

This allows pneumatic vehicle tires with sealant according to the invention and pneumatic vehicle tires without sealant to be distinguished from one another in a, for example automated, process according to the invention, spatially separated and supplied to different recycling processes. In the case of the tire according to the invention sealant and luminescent agent are initially removed from the tire in an additional step.

LIST OF REFERENCE NUMERALS (Part of the Description)
- 1 Tread
- 2 Belt package
- 2a Belt layer
- 2b Belt layer
- 3 Carcass
- 3a Carcass turnup
- 4 Inner layer
- 5 Sealant layer
- 5a Surface of the sealant layer directed radially inward, running in axial direction, essentially parallel to the belt package
- 6 Luminescent agent
- 7 Strips
- 8 Spatial region
- 9 Sidewall
- 10 Bead core
- 11 Bead core profile
- rR Radial direction
- aR Axial direction
- UR Circumferential direction of the tire

The invention claimed is:

1. A pneumatic vehicle tire comprising:
a tread,
sidewalls, and
a sealant layer disposed on an inner layer opposite the tread,
wherein the sealant layer has a radially inward facing surface running in the tire axial direction, and has a plurality of individual spaced apart layers with luminescent agent disposed atop the radially inward facing surface of the sealant layer,
wherein (i) the plurality of individual spaced apart layers with luminescent agent are arranged as a plurality of spaced apart strips running parallel to one another, or (ii) the plurality of individual spaced apart layers with luminescent agent are arranged as discrete regions randomly distributed atop the radially inwardly facing surface of the sealant layer, and
wherein, when illuminated with light, the plurality of individual spaced apart layers with luminescent agent provide visually contrasting effect with the radially inward facing surface of the sealant layer to enhance detection for recycling the tire.

2. The pneumatic vehicle tire of claim 1, wherein the luminescent agent is one of a fluorescent agent and a phosphorescent agent.

3. The pneumatic vehicle tire of claim 1, wherein the luminescent agent absorbs light in the wavelength range from 200 to 700 nm and emits light in the wavelength range from 350 to 800 nm.

4. The pneumatic vehicle tire of claim 1, wherein the plurality of layers with luminescent agent have been applied by a dispersion, or a solution, wherein the dispersion or the solution contains from 1% to 80% by weight of the luminescent agent.

5. The pneumatic vehicle tire of claim 4, wherein liquid of the solution or dispersion comprises water.

6. The pneumatic vehicle tire of claim 1, wherein the plurality of layers with luminescent agent have been applied as a film.

7. The pneumatic vehicle tire of claim 6, wherein the film has a thickness of 1 micrometer to 3500 micrometers, as measured from the radially inward facing surface in the radial direction (rR) perpendicular to the axial direction (aR) of the vehicle tire.

8. The pneumatic vehicle tire of claim 1, wherein the plurality of layers with luminescent agent are arranged as the plurality of spaced apart strips running parallel to one another, the plurality of spaced apart strips being spaced apart in the tire axial direction and each of the plurality of spaced apart strips runs circumferentially in a continuous or interrupted manner.

9. The pneumatic vehicle tire of claim 1, wherein the plurality of layers with luminescent agent are arranged as the discrete regions randomly distributed atop the radially inwardly facing surface of the sealant layer.

10. The pneumatic vehicle tire of claim 1, wherein the layers with the luminescent agent cover 1% to 10% of the radially inward-facing surface of the sealant layer.

11. The pneumatic vehicle tire of claim 1, wherein the sealant layer is a self sealing layer to automatically seal punctures of up to 5 millimeters in diameter.

12. The pneumatic vehicle tire of claim 1, wherein the sealant layer comprises at least one polyolefin.

13. The pneumatic vehicle tire of claim 12, wherein the at least one polyolefin is at least one polybutene.

14. The pneumatic vehicle tire of claim 1, wherein the sealant layer is disposed on the inner layer only in the region opposite the tread and has a black hue, and the plurality of layers with luminescent agent excite in the presence of light having a wavelength range from 200 to 700 nm to emit light in a wavelength range from 350 to 800 nm to provide the visually contrasting effect with the black hue of the sealant layer, thereby enhancing detection for recycling of the tire.

15. The pneumatic vehicle tire of claim 14, wherein the plurality of layers with luminescent agent have been applied as a film, and the film has a thickness of 1 micrometer to 3500 micrometers, as measured from the radially inward facing surface in the radial direction (rR) perpendicular to the axial direction (aR) of the vehicle tire.

\* \* \* \* \*